United States Patent
Kim

(10) Patent No.: US 7,885,552 B2
(45) Date of Patent: Feb. 8, 2011

(54) DRIVER SYSTEM OF IMAGE FORMING APPARATUSES AND METHOD OF CONTROLLING THE SAME

(75) Inventor: Sun Jin Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 274 days.

(21) Appl. No.: 12/042,524

(22) Filed: Mar. 5, 2008

(65) Prior Publication Data

US 2008/0219681 A1 Sep. 11, 2008

(30) Foreign Application Priority Data

Mar. 7, 2007 (KR) .................. 10-2007-0022605

(51) Int. Cl.
*G03G 15/00* (2006.01)
*G06Q 10/00* (2006.01)

(52) U.S. Cl. .................. 399/8; 399/1; 399/11; 399/24; 399/81; 705/28

(58) Field of Classification Search ............. 399/8, 399/11, 81, 1, 24
See application file for complete search history.

(56) References Cited

U.S. PATENT DOCUMENTS

| | | | | |
|---|---|---|---|---|
| 6,023,593 | A * | 2/2000 | Tomidokoro | 399/8 |
| 6,903,831 | B1 * | 6/2005 | Rapke-Kraft et al. | 358/1.13 |
| 7,310,614 | B2 * | 12/2007 | Kaneda et al. | 705/28 |
| 7,426,482 | B2 * | 9/2008 | Inami et al. | 705/26 |
| 7,493,054 | B2 * | 2/2009 | Ujigawa | 399/8 |
| 7,496,702 | B2 * | 2/2009 | Haines | 710/62 |
| 7,650,085 | B2 * | 1/2010 | Kehoe et al. | 399/8 |
| 2002/0159777 | A1 * | 10/2002 | Nagata | 399/8 |
| 2003/0101109 | A1 * | 5/2003 | Kaneda et al. | 705/28 |
| 2005/0281566 | A1 * | 12/2005 | Kaneko | 399/8 |
| 2008/0002995 | A1 * | 1/2008 | Kamisuwa et al. | 399/8 |

FOREIGN PATENT DOCUMENTS

JP 2003-187124 7/2003

OTHER PUBLICATIONS

Web Image Monitor Help. Retrieved from the internet <URL: http://support-download.com/services/device/webhlp/nb/gen/v021/en/contents/cntp_top0...>.

* cited by examiner

*Primary Examiner*—David M Gray
*Assistant Examiner*—Francis Gray
(74) *Attorney, Agent, or Firm*—Staas & Halsey LLP

(57) ABSTRACT

A driver system of image forming apparatuses whose structure is improved to receive a necessary service without additional confirmation by automatically requesting a management service and to improve the efficiency of use of the image forming apparatuses and a method of controlling the same. The driver system of the image forming apparatuses that is provided in a host computer to connect the host computer to the image forming apparatuses in order to perform a management service includes an input unit to receive state information on the image forming apparatuses from the image forming apparatuses and a transmitting unit to transmit a management service requesting signal to a management service supplying unit using the input state information.

15 Claims, 4 Drawing Sheets

DRIVER SYSTEM OF IMAGE FORMING APPARATUSES AND METHOD OF CONTROLLING THE SAME

CROSS-REFERENCE TO RELATED APPLICATION

This application claims the benefit of Korean Application No. 2007-22605, filed in the Korean Intellectual Property Office on Mar. 7, 2007, the disclosure of which is incorporated herein by reference.

BACKGROUND OF THE INVENTION

1. Field of the Invention

Aspects of the present invention relate generally to a driver of an image forming apparatus, and more particularly, to a driver system of image forming apparatuses capable of automatically managing the image forming apparatuses and a method of controlling the same.

2. Description of the Related Art

As inexpensive personal computers (PC) have been developed with advances in PC manufacturing technology, computers have been used extensively. Accordingly, peripheral apparatuses of the computers are also used extensively. Peripheral apparatuses include image forming apparatuses, such as printers, scanners, and multifunction devices.

In addition, various network technologies are used to connect a plurality of PCs to each other over a network. In environments having a plurality of image forming apparatuses, the image forming apparatuses are connected to the network, so that multiple users can use the image forming apparatuses. In order to manage the plurality of image forming apparatuses, a user must inspect each of the image forming apparatuses individually.

For example, the user checks the amount of use of consumption goods (such as toner, ink, paper, etc.) so that, when the consumption goods are running low, the user can request a supplier to provide more consumption goods. When errors occur in one or more of the image forming apparatuses, the user directly contacts the supplier to inform the supplier of the errors and to request servicing.

However, when the plurality of image forming apparatuses are managed by the above method, the plurality of image forming apparatuses cannot be managed effectively. Further, the user is required to inspect each of the image forming apparatuses individually. Therefore, it is necessary to automatically manage the plurality of image forming apparatuses so as to improve the efficiency of use of the image forming apparatuses.

SUMMARY OF THE INVENTION

Aspects of the present invention provide a driver system of image forming apparatuses and method of using the same with an improved structure so as to receive a necessary service without additional confirmation by automatically requesting a management service and to improve the efficiency of use of the image forming apparatuses.

According to an aspect of the present invention, a driver system of image forming apparatuses that is provided in a host computer to connect the host computer to the image forming apparatuses in order to perform a management service is provided. The driver system comprises an input unit to receive state information on the image forming apparatuses from the image forming apparatuses; and a transmitting unit to transmit a management service requesting signal to a management service supplying unit based on the state information.

According to another aspect of the present invention, the driver system further includes a determining unit to determine whether to request a management service based on the input state information, wherein, when the determining unit determines that the management service is to be requested, the transmitting unit transmits the management service requesting signal to the management service supplying unit.

According to another aspect of the present invention, the input unit further receives user information from a user.

According to another aspect of the present invention, the driver system further includes a storage unit that stores the user information input from the user and information of the management service supplying unit.

According to another aspect of the present invention, the driver system further includes an output unit to output the state information to a predetermined image display unit.

According to another aspect of the present invention, the output unit outputs icons corresponding to image forming apparatuses as a pop-up and outputs the state information of the image forming apparatuses as a pop-up.

According to another aspect of the present invention, the driver system further includes a calculating unit to calculates a date at which consumption goods are to be exchanged or a date at which a toner is to be exchanged using the state information, and the output unit receives the calculated date and outputs the calculated date to the predetermined image display unit.

According to another aspect of the present invention, the determining unit determines whether the driver system is in an automatic management service mode when the management service is requested, and the transmitting unit automatically transmits the management service requesting signal to the management service supplying unit when the determining unit determines that the driver system is in the automatic management service mode.

According to another aspect of the present invention, the output unit outputs a selection confirming window to allowing the user to select whether to transmit the management service requesting signal when the determining unit determines that the driver system is not in the automatic management service mode.

According to another aspect of the present invention, the input unit further receives a selection signal from the user to transmit the management service requesting signal.

According to another aspect of the present invention, the output unit groups the image forming apparatuses in accordance with a predetermined basis and outputs icons corresponding to the groups to the predetermined image display unit.

According to another aspect of the present invention, a method of controlling a driver system of image forming apparatuses provided in a host computer to connect the host computer to the image forming apparatuses in order to perform a management service is provided. The method comprises receiving state information of the image forming apparatuses from the image forming apparatuses; and transmitting a management service requesting signal to a management service supplying unit based on the state information.

According to another aspect of the invention, the method further includes determining whether to request a management service using the input state information. If the management service is requested, the management service requesting signal is transmitted to the management service supplying unit.

According to another aspect of the present invention, the method further comprises receiving user information from a user.

According to another aspect of the present invention, the method further includes outputting the state information to a predetermined image display unit.

According to another aspect of the present invention, the outputting of the state information to the predetermined image display unit comprises outputting the state information of the image forming apparatuses as a pop-up.

According to another aspect of the present invention, the method further includes calculating a date at which consumption goods are to be exchanged or a date at which a toner is to be exchanged using the input state information, and outputting the calculated date to the predetermined image display unit.

According to another aspect of the present invention, the determining of whether to request the management service using the input state information comprises determining whether the driver system is in an automatic management service mode when the management service is requested. If the driver system is in the automatic management service mode, the management service requesting signal is transmitted to the management service supplying unit.

According to another aspect of the present invention, the method further comprises outputting a selection confirming window to the predetermined image display unit so as to allow the user to select transmission of the management service requesting signal when it is determined that the driver system is not in the automatic management service mode.

According to another aspect of the present invention, the outputting of the input state information comprises grouping the image forming apparatuses in accordance with a predetermined basis; and outputting icons corresponding to the groups to be displayed on the predetermined image display unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
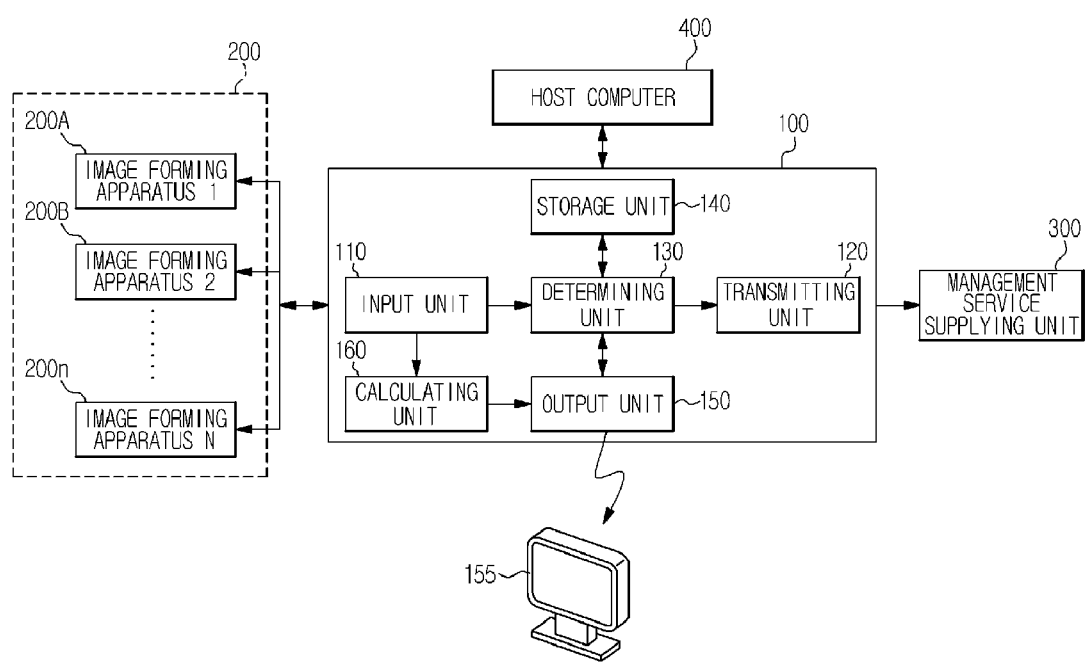
FIG. 1 is a block diagram of a driver system of image forming apparatuses according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a driver system 100 of image forming apparatuses according to an embodiment of the present invention. The driver system 100 includes an input unit 110 and a transmitting unit 120. According to other aspects of the invention, the driver system 100 may include additional and/or different components. The driver system 100 may be located anywhere in a network, such as in a client device and/or host computer, a server, or a stand-alone computer. Such a network can be a wired network, such as a LAN (Local Area Network), or a wireless network. The various components of the driver system 100 may be incorporated in a single unit or separate units. For example, the storage unit 140 shown in FIG. 1 may be located separately from the other components of the driver system 100.

The input unit 110 receives state information on the image forming apparatuses from a plurality of image forming apparatuses 200, such as the image forming apparatuses 200a, 200b, and 200n shown in FIG. 1. The image forming apparatuses 200 can include printers, copiers, fax machine, or any combination of those or other image forming apparatuses. The state information of the image forming apparatuses 200 refers to information on the states of the image forming apparatuses 200. The information may include the number of printed sheets, the usage amount of toner, and the usage amount of consumption goods by the image forming apparatuses 200, and/or error conditions (such as a paper jam or hardware malfunction). The state information may also be used for other purposes, such as determining how often an image forming apparatus is being used. The state information may be unique to each of the image forming apparatuses 200 such that the state information of the image forming apparatus 200A need not be the same as the state information of the image forming apparatus 200B.

As described above, the state information of the image forming apparatuses 200 is received by the input unit 110 to be used for determining whether there are errors in the image forming apparatuses 200, whether the toner needs to be exchanged in the image forming apparatuses 200, and/or whether the consumption goods are to be exchanged in the image forming apparatuses 200.

Depending on the state information, the transmitting unit 120 may transmit a management service requesting signal to a management service supplying unit 300 that supplies the management service so as to request a management service from the management service supplying unit 300. For example, the transmitting unit 120 may request the management service in order to exchange the toner when the state information input from the input unit 110 indicates that the amount of consumption of the toner is 90% in the image forming apparatus 200N. The transmitting unit 120 transmits the management service requesting signal to the management service supplying unit 300 to request additional toner from the management service.

The management service supplying unit 300 that is in charge of the services of the image forming apparatuses 200 transmits the management service requesting signal to the management service supplying unit 300 via a mobile telephone, a personal digital assistant (PDA), instant messaging, E-mail, or other electronic communication technique. When the management service requesting signal for exchanging the toner is transmitted to the management service supplying unit 300, a supplier that confirms the management service request supplies new toner.

Although not required in all aspects, a determining unit 130 that determines whether to request the management service using the input state information may be provided, as shown in FIG. 1. The determining unit 130 determines whether the management service is to be requested using the state information input from the input unit 110. The determining unit 130 may compare the state information with pre-set levels in determining whether the management service is to be requested, such as a minimum percentage of remaining toner or minimum percentage of remaining paper. For example, when the state information indicates that the amount of toner used is 95% in one or more of the image forming apparatuses 200, the management service is requested. In order to request the management service, the transmitting unit 120 transmits the management service requesting signal to the management service supplying unit 300.

The input unit 110 may receive user information from the user. When the management service requesting signal is transmitted to the management service supplying unit 300, the user information may be transmitted together with the management service requesting signal so that the management service supplying unit 300 determines from which of the image forming apparatuses 200 the management service requesting signal is transmitted.

The user information may include personal information, such as the name and address of the user, and information of one of the image forming apparatuses 200, such as the manufacturer, model number, type, etc. The input user information is stored in the storage unit 140. Information on the management service supplying unit 300 may also be stored in the storage unit 140. In order to transmit the management service requesting signal to the management service supplying unit 300, the electronic mail address, the server address, and the mobile telephone address of the management service supplying unit 300 may also be stored in the storage unit 140.

Figure 2:
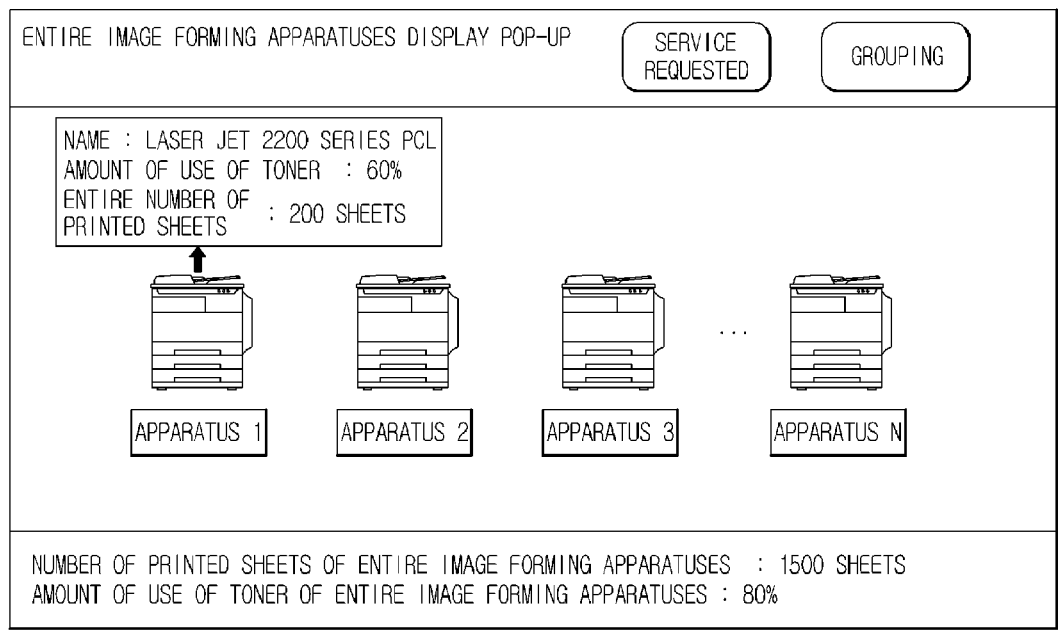
FIG. 2 illustrates iconized image forming apparatuses that are output in the form of a pop-up according to an embodiment of the present invention.

FIG. 2 shows icons corresponding to each of the image forming apparatuses 200 that are displayed in the form of a popup (i.e., a popup window) according to an embodiment of the present invention. An output unit 150 displays the icons in the form of a pop-up on a display 155. The output unit 150 displays icons corresponding to each of the plurality of image forming apparatuses 200 connected to the driver system 100 as well as status information for the image forming apparatuses 200 collectively in the form of a pop-up window. When it is necessary to exchange consumption goods in a specific image forming apparatus, or when a management service is required, such when a printed sheet is jammed, the output unit 150 displays the state information on the icon of the corresponding image forming apparatus and activates and outputs a pop-up window. The output unit 150 may be the display unit 155 coupled to the driver system 100, or may transmit data to be displayed on a predetermined image display unit remotely connected to the driver system 100.

When an iconized image forming apparatus is clicked, or when a mouse is moved to the icon of one of the image forming apparatuses 200, the output unit 150 outputs state information of the corresponding image forming apparatus, such as the number of printed sheets and/or the amount of toner used in the corresponding image forming apparatus, in the form of a pop-up. When the icons of the image forming apparatuses are displayed as the pop-up, the icons may be automatically displayed when consumption goods require exchanging and/or replacing, or when errors are generated in the image forming apparatuses, regardless of whether the user has selected the corresponding icon. Although described in terms of a pop-up, the present invention is not limited thereto. For example, the information may be displayed in the same or in a separate window.

Figure 3:
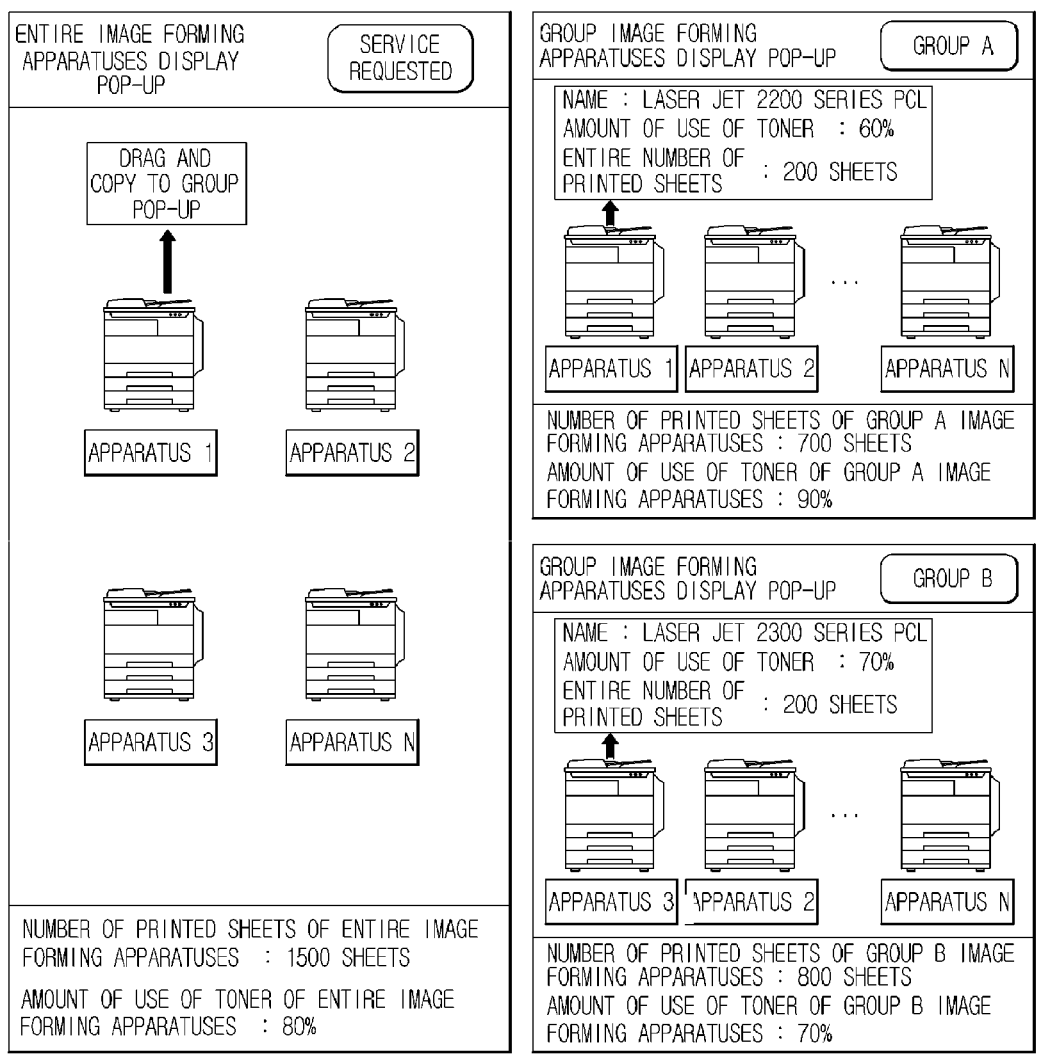
FIG. 3 illustrates entire iconized image forming apparatuses and grouped image forming apparatuses that are output in the form of a pop-up according to an embodiment of the present invention.

FIG. 3 shows a display of all icons corresponding to the image forming apparatuses 200, as well as icons corresponding to one or more groups of image forming apparatuses in the form of a pop-up window. The output unit 150 may group the image forming apparatuses in accordance with a predetermined basis and may display icons corresponding to each of the groups.

As shown in FIG. 3, when a grouping button is clicked, any number of groups may be generated, such as group A, group B, and so on. The user may provide names to identify the groups. Each group may contain one or more of the image forming apparatuses 200, and the collective status information for that group as opposed to all of the image forming apparatuses 200. Similarly, an image forming apparatus, such as image forming apparatus 200a, may be assigned to one or more groups. For example, the image forming apparatuses 200 may be grouped, and the resulting groups named, according to the floors or departments of a building or organization. When the above-described grouping is completed, a pop-up window containing all of the image forming apparatuses 200 and a pop-up window containing only image forming apparatuses belonging to a particular group, may be displayed.

In addition, when the user drags the icon of a desired image forming apparatus from the pop-up window displaying all the image forming apparatuses 200 to the pop-up window in which one of the groups of image forming apparatuses is displayed, the state information of the image forming apparatus and the icon of the image forming apparatus are copied to the pop-up window of the corresponding group. The state information of all the image forming apparatuses 200 is adjusted and output by group. In addition, the state information of the total number of printed sheets and the amount of use of the toner of the image forming apparatus generated in the pop-up window may be displayed in the pop-up window.

Since it is possible for the user to obtain the state information of the consumption goods or the number of printed sheets of an image forming apparatus provided in a specific group, the user can effectively manage the image forming apparatuses 200 at a group level as opposed to an entire network level. For example, if the printing amount of group A by month is 100 sheets and the printing amount of group B by month is 200 sheets, the image forming apparatuses in the group A are moved to the group B, so that the image forming apparatuses can be effectively managed and expenses reduced.

When the management service is requested, the determining unit 130 determines whether the driver system 100 is in an automatic management service mode. If the driver system 100 is in the automatic management service mode, the transmitting unit 120 automatically transmits the management service requesting signal to the management service supplying unit 300 when necessary. If it is necessary to exchange and/or replace the consumption goods in the image forming apparatus or when a malfunction (such as a paper jam) has occurred in one of the image forming apparatuses 200, the determining unit 130 determines whether the driver system 100 is in the automatic management service mode. If the driver system 100 is in the automatic management service mode, the driver system 100 automatically transmits the management service requesting signal to the management service supplying unit 300.

If the driver system is not in the automatic management service mode, the output unit 150 outputs a selection confirming window for the user to select whether to transmit the management service requesting signal. The input unit 110 further receives a selection signal for transmitting the management service requesting signal from the user. For example, if the driver system is not in the automatic management service mode, the output unit 150 displays the selection confirming window to allow the user to select whether to transmit the management service requesting signal. The selection confirming window may display a message, such as "Is the management service to be requested?" The user may click a confirmation button so that the input unit 110 receives the selection signal for transmitting the management service requesting signal. If the user decides not to request the management service, the user may select a cancellation button instead, and the management service requesting signal is not transmitted.

Although not required in all aspects, as shown in FIG. 2 the driver system 100 includes a calculating unit 160 to calculate a date at which the consumption goods are to be exchanged and/or a date at which the toner is to be exchanged using the input state information. The calculating unit 160 calculates the date at which the consumption goods are to be exchanged and the date at which the toner is to be exchanged are calculated based on the state information, such as the average number of printed sheets and the average amount of use of the toner, received from the input unit 110. The output unit 150 may display the date at which the consumption goods are to be exchanged and the date at which the toner is to be exchanged via a predetermined image display unit so that the user easily transmits the service requesting signal to the service supplying unit 300.

Figure 4:
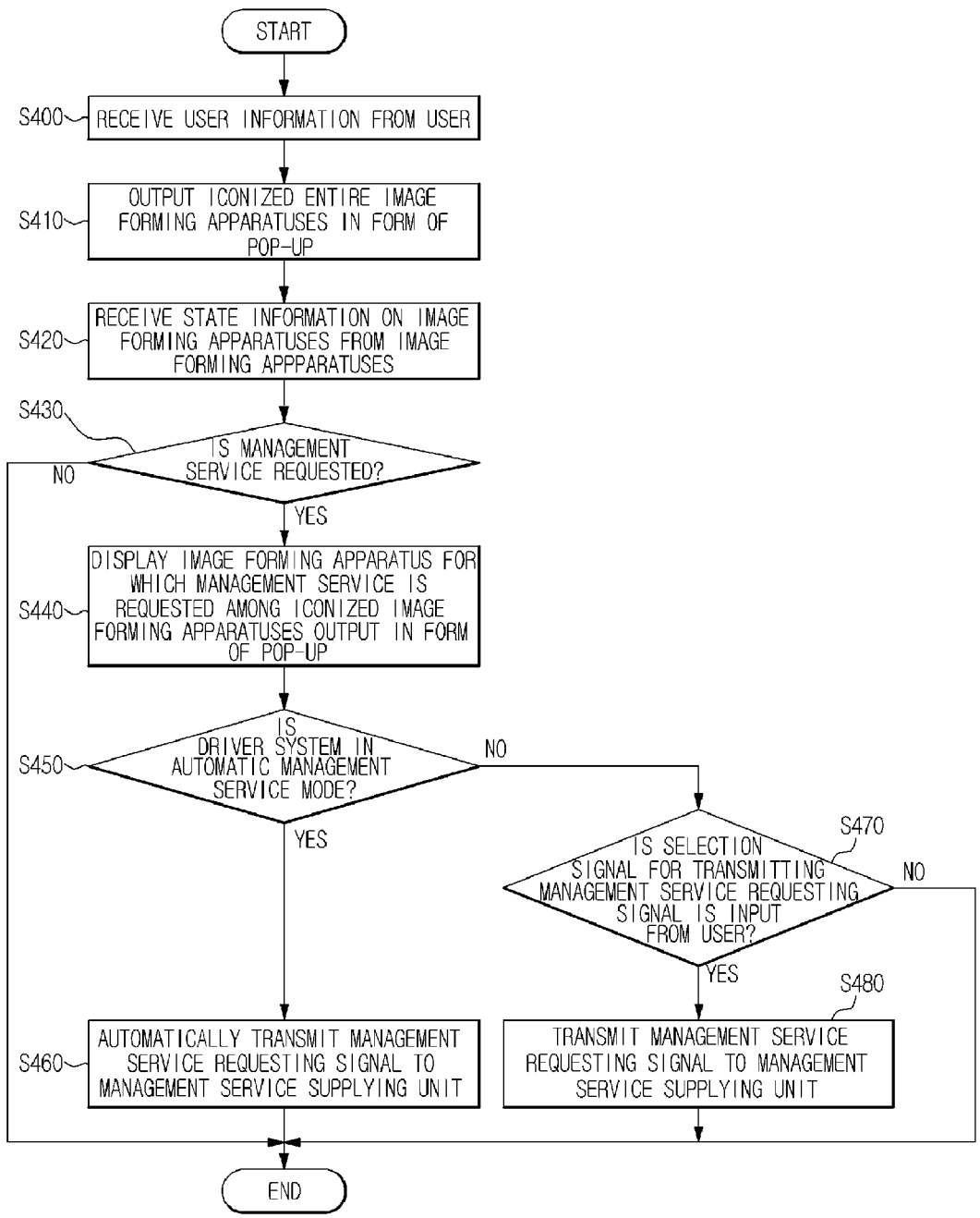
FIG. 4 is a flowchart illustrating processes of controlling the driver system of the image forming apparatuses for performing a management service according to an embodiment of the present invention.

A process of controlling the driver system of the image forming apparatuses according to an embodiment of the present invention will be described with respect to FIG. 4. FIG. 4 is a flowchart showing processes of controlling the driver system of the image forming apparatuses for performing a management service according to an embodiment of the present invention. In operation S400, user information is received from the user. When the driver of the image forming apparatuses 200 is provided in a host computer 400, after previously programmed information of a service supplying unit is stored in the host computer 400 of the user, the user is requested to provide the user information. When the user information is input, the driver system 100 is ready to perform a management service. The user information need not be input according to all aspects of the invention. Similarly, according to other aspects of the invention, the user information need be input only once, such as during setup of the driver system 100, or when the user information needs to be updated.

When the management service is performed, the icons of the image forming apparatuses 200 are displayed in the form of a pop-up window in operation S410. When an icon of one of the image forming apparatuses is clicked, or a mouse is positioned on the icon, state information of the corresponding image forming apparatus is displayed. In addition, information of the number of printed sheets and the amount of use of a toner of the entire image forming apparatuses may also be displayed. The user can thus obtain information of the consumption goods use state, the number of printed sheets, or other state information for any or all of the image forming apparatuses 200. While not required, the pop-up window can be created as part of a standalone application or an internet browser using JAVA or other programming language or technique.

When a grouping button is clicked, the user can generate groups of image forming apparatuses and provide names of the generated groups. The user may drag an icon of a particular image forming apparatus from a window displaying all of the image forming apparatuses 200 to a window displaying the image forming apparatuses in a particular group. The state information and the icon of the corresponding image forming apparatus are then copied to the pop-up window of the selected group.

The state information of the selected image forming apparatus is received from the image forming apparatus in operation S402. Whether to request the management service using the input state information is determined in operation S430. If the management service is to be requested, the icon of the image forming apparatus for which the management service is to be requested is displayed in the form of a pop-up in operation S440. The icon of the image forming apparatus for which the management service is to be requested, such as an image forming apparatus requiring additional consumption goods and/or toner, or an image forming apparatus that has malfunctioned, is displayed in the form of the pop-up so that the user can request the management service.

Whether the driver system 100 is in an automatic management service mode is determined in operation S450. If the driver system 100 is in the automatic management service mode, a management service requesting signal requesting the management service is automatically transmitted to a management service supplying unit in operation S460.

If the driver system is not in the automatic management service mode, whether a selection signal for transmitting the management service requesting signal is input from the user is determined in operation S470. If the selection signal for transmitting the management service requesting signal is input, the management service requesting signal is transmitted to the management service supplying unit in operation S480.

As described above, in the driver system of the image forming apparatuses according to aspects of the present invention and the method of controlling the same, the management service is automatically requested so that the user can receive a necessary service without additional confirmation.

In addition, since the amount of use of the consumption goods of the image forming apparatuses is calculated automatically, it is possible to automatically order the consumption goods, so the user can effectively manage the image forming apparatuses. Furthermore, the user can check the state of the image forming apparatuses in each group, so the image forming apparatuses can be easily managed.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), DVDs, CDs, magnetic tapes, floppy disks, optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A driver system of image forming apparatuses that is provided in a host computer to connect the host computer to a plurality of image forming apparatuses in order to perform a management service, the driver system comprising:
   an input unit to receive state information on the image forming apparatuses from the plurality of image forming apparatuses;
   a determining unit to determine whether to request a management service based on the input state information and determine whether the driver system is in an automatic management service mode or a manual management service mode when the management service is requested;
   a transmitting unit to transmit a management service requesting signal and a user information of the image forming apparatuses that request the management service to a management service supplying unit if the driver system is in the automatic management service mode; and
   an output unit to output a selection confirming window to the predetermined image display unit so as to allow the user to select transmission of the management service requesting signal when it is determined that the driver system is in the manual management service mode.

2. The driver system according to claim 1, wherein the determining unit reviews the state information to determine the status of all of the image forming apparatuses and determines a type of service to be supplied to individual image forming apparatuses.

3. The driver system according to claim 1, further comprising a storage unit to store the user information and information on the management service supplying unit.

4. The driver system according to claim 1, further comprising
   a calculating unit to calculate a date at which consumption goods are to be exchanged or a date at which a toner is to be exchanged using the state information.

5. The driver system according to claim 1, wherein the output unit outputs icons corresponding to the image forming apparatuses as a pop-up.

6. The driver system according to claim 5, wherein the output unit outputs the state information of the image forming apparatuses as a pop-up.

7. The driver system according to claim 4, wherein the output unit receives the calculated date and outputs the calculated date to the predetermined image display unit.

8. A method of controlling a driver system of image forming apparatuses provided in a host computer to connect the host computer to a plurality of image forming apparatuses in order to perform a management service, the method comprising:
   receiving state information of the image forming apparatuses from the plurality of image forming apparatuses;
   determining whether to request a management service using the input state information and whether the driver system is in an automatic management service mode or a manual manaqement service mode when the management service is requested;
   transmitting a management service requesting signal and a user information of the image forming apparatuses that request the management service to a management service supplying unit when it is determined that the driver system is in the automatic management service mode; and
   outputting a selection confirming window to the predetermined image display unit so as to allow the user to select transmission of the management service requesting signal when it is determined that the driver system is in the manual management service mode.

9. The method according to claim 8, wherein the determining of whether to request the management service comprises:
   reviewing the status information to determine the status of all of the applications; and
   determining a type of service to be supplied to individual image forming apparatuses.

10. The method according to claim 8, further comprising receiving user information from a user.

11. The method according to claim 8, wherein the outputting of the state information comprises displaying icons corresponding to the image forming apparatuses as a pop-up.

12. The method as claimed in claim 11, wherein the outputting of the state information comprises outputting the state information of the image forming apparatuses as a pop-up.

13. The method according to claim 8, further comprising:
   calculating a date at which consumption goods are to be exchanged or a date at which a toner is to be exchanged using the input state information; and
   outputting the date to the predetermined image display unit.

14. The method according to claim 8, further comprising receiving a selection signal for transmitting the management service requesting signal from the user after outputting the state information to the predetermined image display unit.

15. The method according to claim 8, wherein the outputting of the input state information comprises:
   grouping the image forming apparatuses in accordance with a predetermined basis; and
   outputting icons corresponding to the groups to be displayed on the predetermined image display unit.

* * * * *

UNITED STATES PATENT AND TRADEMARK OFFICE
CERTIFICATE OF CORRECTION

| | | |
|---|---|---|
| PATENT NO. | : 7,885,552 B2 | Page 1 of 1 |
| APPLICATION NO. | : 12/042524 | |
| DATED | : February 8, 2011 | |
| INVENTOR(S) | : Sun Jin Kim | |

It is certified that error appears in the above-identified patent and that said Letters Patent is hereby corrected as shown below:

Column 10, Line 6, In Claim 8, delete "manaqement" and insert --management--, therefor.

Signed and Sealed this
Nineteenth Day of April, 2011

David J. Kappos
*Director of the United States Patent and Trademark Office*